United States Patent
Steinhour

(10) Patent No.: US 9,656,881 B2
(45) Date of Patent: May 23, 2017

(54) PHASE CHANGE LIQUID PURIFIER AND PUMP

(71) Applicant: Leif Alexi Steinhour, Berkeley, CA (US)

(72) Inventor: Leif Alexi Steinhour, Berkeley, CA (US)

( * ) Notice: Subject to any disclaimer, the term of this patent is extended or adjusted under 35 U.S.C. 154(b) by 253 days.

(21) Appl. No.: 14/210,226

(22) Filed: Mar. 13, 2014

(65) Prior Publication Data

US 2014/0284200 A1    Sep. 25, 2014

Related U.S. Application Data

(60) Provisional application No. 61/783,431, filed on Mar. 14, 2013.

(51) Int. Cl.
| | | |
|---|---|---|
| *B01D 3/10* | (2006.01) | |
| *C02F 1/14* | (2006.01) | |
| *B01D 1/04* | (2006.01) | |
| *C02F 1/32* | (2006.01) | |

(52) U.S. Cl.
CPC ............ *C02F 1/14* (2013.01); *B01D 1/04* (2013.01); *C02F 1/325* (2013.01); *C02F 2201/3228* (2013.01); *C02F 2303/04* (2013.01)

(58) Field of Classification Search
CPC .......... B01D 1/04; B01D 1/0005; B01D 1/26; B01D 1/30; C02F 1/14
USPC ........ 159/17.1, 22, 34; 203/DIG. 1; 202/181
See application file for complete search history.

(56) References Cited

U.S. PATENT DOCUMENTS

| | | | | |
|---|---|---|---|---|
| 4,270,981 | A * | 6/1981 | Stark | C02F 1/14 126/635 |
| 4,314,890 | A * | 2/1982 | Beck | B01D 3/00 203/1 |
| 4,585,522 | A * | 4/1986 | Beck | B01D 3/00 202/181 |
| 4,869,067 | A * | 9/1989 | Sears | B01D 1/221 165/138 |
| 5,049,199 | A * | 9/1991 | Capen | C13B 25/001 127/9 |
| 5,650,050 | A * | 7/1997 | Kaufmann | B01D 1/16 159/903 |
| 5,968,321 | A * | 10/1999 | Sears | B01D 1/221 159/24.1 |
| 6,440,275 | B1 * | 8/2002 | Domen | C02F 1/14 159/16.1 |
| 6,767,433 | B2 * | 7/2004 | Foster | C02F 1/14 159/903 |
| 8,083,902 | B2 * | 12/2011 | Al-Garni | B01D 1/0035 159/14 |

(Continued)

*Primary Examiner* — Nina Bhat

(57) ABSTRACT

Systems, methods, and apparatus are provided for purifying and pumping liquids, and more particularly, for purifying and pumping water. The apparatus includes a chamber including a top portion and a bottom portion. A surface configured to be heated is proximate the bottom portion of the chamber. A baffle is disposed within the chamber and above the surface. The baffle is disposed at an angle relative to a vertical direction. The chamber further includes an inlet and a first outlet. The surface heats a liquid in the chamber, causing the liquid to boil. In operation, bubbles rise from the surface and are forced in a horizontal direction by the baffle disposed in the chamber.

22 Claims, 10 Drawing Sheets

(56) References Cited

U.S. PATENT DOCUMENTS

| | | | |
|---|---|---|---|
| 2003/0150704 A1* | 8/2003 | Posada | B01D 1/04 203/1 |
| 2004/0060808 A1* | 4/2004 | LaViolette | B01D 3/346 202/234 |
| 2011/0120182 A1* | 5/2011 | Haussmann | F25B 39/022 62/524 |

* cited by examiner

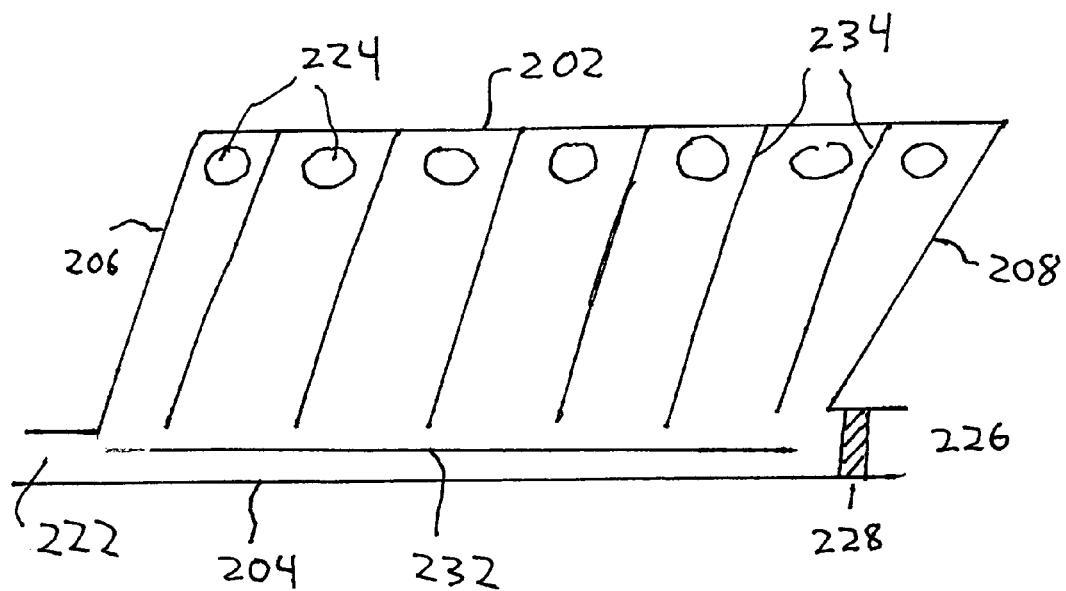
Figure 4
Figure 5
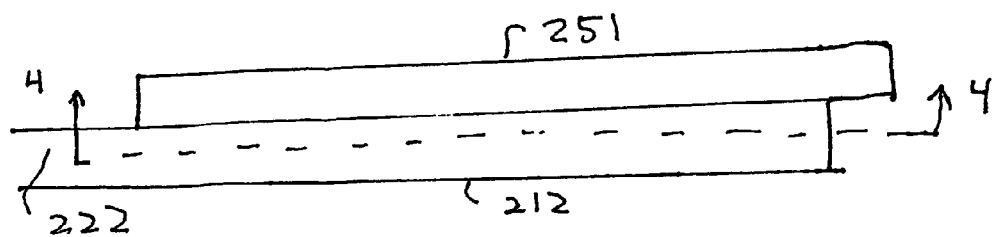

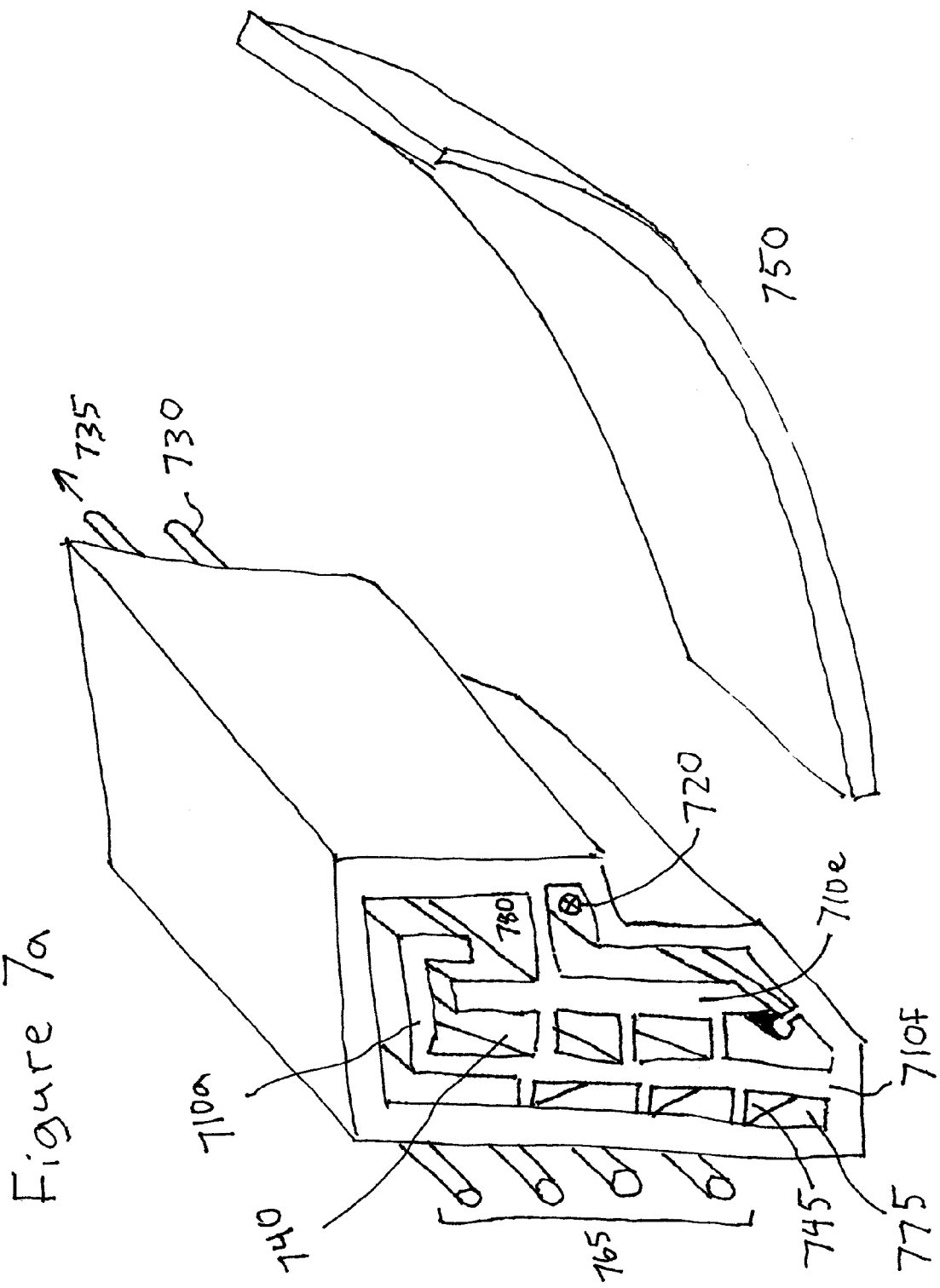

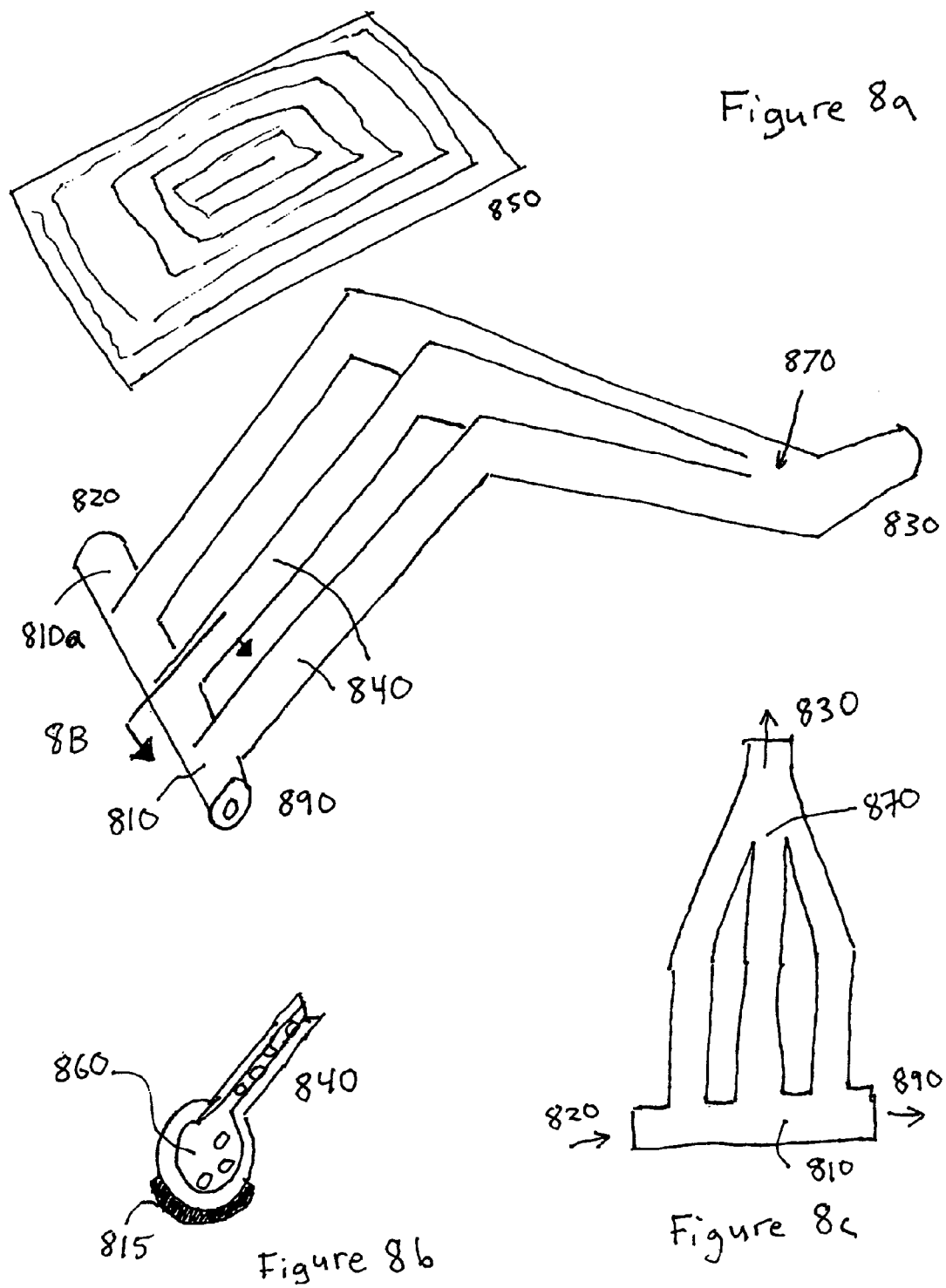

PHASE CHANGE LIQUID PURIFIER AND PUMP

STATEMENT OF GOVERNMENT SUPPORT

This invention was made with government support under Contract No. DE-AC02-05CH11231 awarded by the U.S. Department of Energy. The government has certain rights in this invention.

RELATED APPLICATIONS

Not applicable.

TECHNICAL FIELD

This disclosure relates generally to apparatus and methods for purifying and pumping liquids, and more particularly to apparatus and methods for purifying and pumping water.

BACKGROUND

Water resource issues in the world's lesser developed countries present special challenges. These challenges include limited drinking-water supplies, lack of sanitation facilities, and difficulties in water transport. These challenges are compounded by the limited availability of traditional sources of power in such countries, in that fossil fuel and electrical power are expensive and result in increased costs associated with the initial purchase and operation of equipment.

SUMMARY

Disclosed herein are apparatus and methods for purifying a liquid (e.g., water) while simultaneously pumping it. During operation, the liquid being purified undergoes a phase change from liquid to gas, allowing the liquid to be moved upward and horizontally.

One innovative aspect of the subject matter described in this disclosure can be implemented with an apparatus including a chamber having a top portion and a bottom portion. A surface configured to be heated (also referred to herein as a "heated surface") is proximate the bottom portion of the chamber. At least one baffle is disposed within the chamber and above the surface. The baffle is disposed at an angle relative to a vertical direction. The chamber further includes an inlet and a first outlet.

In some embodiments, the inlet is proximate the bottom portion. In some embodiments, the first outlet is proximate the top portion. In some embodiments, the baffle is angled away from the inlet. In some embodiments, the baffle is angled towards the first outlet. In some embodiments, the inlet is proximate a first side of the chamber, and the first outlet is proximate a second side of the chamber.

In some embodiments, the surface is disposed within the chamber. In some embodiments, the surface is disposed on an outer surface of the chamber. In some embodiments, the surface is configured to be heated with solar energy. In some embodiments, the surface comprises a visible light-absorbing material. In some embodiments, the visible light-absorbing material comprises a dark-colored material. In some embodiments, the visible light-absorbing material is transparent to ultraviolet radiation.

In some embodiments, the device further comprises a second outlet. The second outlet is proximate the bottom portion of the chamber and proximate the second side of the chamber.

Another innovative aspect of the subject matter described in this disclosure can be implemented by an apparatus including a chamber having a top portion and a bottom portion. The chamber is defined by a top wall, a bottom wall, a first side wall, a second side wall, a back wall, and a front wall. A surface configured to be heated (also referred to herein as a "heated surface") is proximate the bottom portion of the chamber. A baffle is disposed within the chamber and above the surface. The baffle is disposed at an angle relative to a vertical direction. The chamber further includes an inlet and a plurality of outlets. The plurality of outlets is defined by the back wall and are proximate a top portion of the chamber.

In some embodiments, the baffle is angled away from the inlet. In some embodiments, the surface is disposed within the chamber. In some embodiments, the surface is disposed on an outer surface of the chamber. In some embodiments, the surface is configured to be heated with solar energy. In some embodiments, the surface comprises a visible light-absorbing material. In some embodiments, the visible light-absorbing material comprises a dark-colored material. In some embodiments, the visible light-absorbing material is transparent to ultraviolet radiation.

Another innovative aspect of the subject matter described in this disclosure can be implemented by a method including supplying a liquid to an inlet of a chamber, the chamber having a top portion, a bottom portion, and a baffle disposed within the chamber. The baffle is disposed at an angle relative to a vertical direction. The liquid is heated and boiled with a surface proximate the bottom portion of the chamber. Bubbles rise from the surface and are forced in a horizontal direction by the baffle. The liquid is transported to an outlet of the chamber, where it may be collected.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 4 and 5 show examples of schematic illustrations of a phase change purifier/pump.

FIGS. 7A and 7B show examples of schematic illustrations of a phase change purifier/pump.

FIGS. 8A-8C show examples of schematic illustrations of a phase change purifier/pump.

DETAILED DESCRIPTION

Introduction

There is a need for relatively inexpensive equipment for the purpose of pumping water which can be operated using power sources that are readily available to persons in lesser developed countries (e.g., solar power). Since water sources in many lesser developed countries may be impure, containing either undesirable particulate matter or dissolved contaminants such as salt, and may be further contaminated with infectious agents such as bacteria, there is also a need for simultaneously decontaminating and disinfecting the water during transport.

Such equipment should be simply constructed using readily available materials and have no complex moving parts, resulting in lower equipment costs and reduced maintenance issues. Such equipment should also be capable of being sized to the amount of water desired to be processed.

Embodiments of phase change purifiers/pumps disclosed herein generally comprise a chamber having a top portion and a bottom portion. A heat source is in thermal contact or communication with a surface, which heats a liquid in the bottom portion of the chamber. At least one baffle is disposed within the chamber, above the surface, and at an angle relative to a vertical direction. The source of heat may not always be beneath the chamber, so long as the surface that is heated is proximate the bottom portion of the chamber. For example, there are solar applications where the light from the sun passes through the chamber and is absorbed by the surface, thereby heating the surface. The chamber also includes at least one fluid inlet and at least one fluid outlet. For simplicity, as used herein, a purifier/pump may sometimes be referred to as a purifier.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Apparatus

Figure 1:
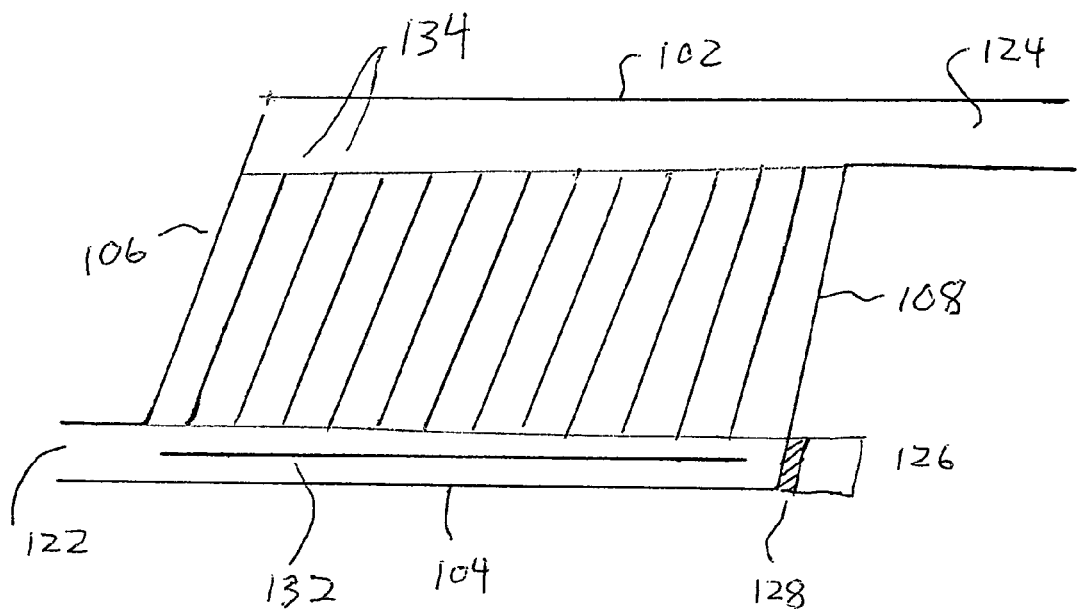
FIGS. 1 and 2 show examples of schematic illustrations of a phase change purifier/pump.
Figure 2:
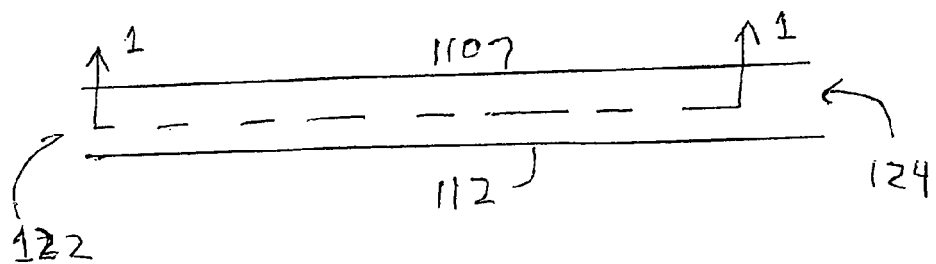

FIGS. 1 and 2 show examples of schematic illustrations of a phase change purifier/pump. FIG. 2 shows an example of a schematic illustration of a top-down view of the purifier. FIG. 1 shows an example of a cross-sectional schematic illustration of the purifier through line 1-1 of FIG. 2.

As shown in FIGS. 1 and 2, a phase change purifier/pump includes a chamber 100 having a top wall 102, a bottom wall 104, a side wall 106, a side wall 108, a back wall 110, and a front wall 112. The walls of the chamber 100 define an inlet 122 and a first outlet 124. In some embodiments, the walls of the chamber 100 may further define a second outlet 126. When the purifier is in operation, the second outlet 126 may be plugged or sealed with a plug 128 or closed off with a valve. In some embodiments, when the pump is in operation, the second outlet 126 may be allowed to leak out a waste stream of a liquid. The chamber 100 includes a surface 132 disposed inside the chamber that is configured to be heated. Also disposed inside the chamber 100 is a baffle or a plurality of baffles 134.

The chamber 100 may be constructed of any material capable of being formed into the desired shape and being able to contain a liquid. Such materials include, for example, metals, plastics, composites, ceramics, glasses, or concrete. While the chamber 100 is shown in FIGS. 1 and 2 as having a trapezoidal shape, in some embodiments the chamber may have any conveniently-constructed shape, such as cylindrical, for example.

The baffles 134 are disposed above the surface 132 at an angle relative to a vertical direction. In some embodiments, the baffles 134 may be disposed at an angle of 30 degrees to 60 degrees relative to a vertical direction. In some embodiments, the baffles 134 are disposed at an angle of 45 degrees relative to a vertical direction. The baffles 134 are in contact with the interior of the back wall 110 and the interior of the front wall 112, forming a plurality of channels. Liquid entering the chamber 100 flows through one of the channels before reaching the first outlet 124.

In some embodiments, the baffles 134 may be made out of the same material as the chamber 100. In some embodiments, the baffles 134 may be flat pieces of material that are disposed in the chamber 100 to define the channels. In some embodiments, the baffles 134 may be hollow.

In some embodiments, a plurality of pipes or hollow cylinders may be disposed in the chamber at an angle relative to a vertical direction. The pipes may define the channels and baffles.

In some embodiments, the inlet 122 is positioned so that the baffles 134 slant away from the inlet 122. In some embodiments, the inlet 122 is positioned proximate a bottom portion of the chamber. In some embodiments, the first outlet 124 is positioned so that the baffles 134 slant towards the first outlet 124.

The surface 132 in the chamber is configured to be heated. Heating the surface 132 may cause liquid in the chamber to boil, forming bubbles in the liquid. Many different techniques may be used to heat the surface 132. In some embodiments, the surface 132 may be connected to an electric power source (not shown). The electric power source may provide energy to heat the surface 132 and to cause a liquid in the chamber to boil.

In some embodiments, the surface 132 may be defined by a tube or pipe. A heated fluid (e.g., waste heat from an industrial process) may flow though the tube, heating the tube and causing a liquid in the chamber to boil.

In some embodiments, the surface 132 may be heated with solar energy (i.e., sunlight). In some embodiments, for the surface 132 to be heated with solar energy, a bottom or side portion of the chamber 100 may be transparent, allowing for the transmission of solar energy to the surface 132. For example, bottom or side portions of the chamber 100 may include a clear plastic, such as polycarbonate. In some embodiments, portions the interior walls of the chamber 110, proximate the bottom or side portions of the chamber that are transparent to allow for the passage of light, may be reflective or mirrored. These reflective or mirrored walls may keep ultraviolet (UV) light within the chamber and give it a greater path length through the water, which may serve to further purify the water.

For example, in some embodiments, when the surface 132 is heated with solar energy, the surface 132 may include a transparent material, such as a glass, a ceramic, or a plastic that has been coated with a light-absorbing material, such as a dark coating. The dark coating may allow for the absorption of solar energy and heating of the surface 132.

In some embodiments, the surface 132 includes a material that is substantially transparent to ultraviolet light while absorbing the rest of the spectrum. Using such a material may allow for transmission of ultraviolet light to a larger volume of water in the chamber, which may aid in purifying the water. One such material is Wood's glass, for example. Wood's glass is special barium-sodium-silicate glass incorporating about 9% nickel oxide. It is opaque to nearly all visible light rays except the longest red and shortest violet wavelengths; it is quite transparent in the violet/ultraviolet in a band between 320 and 400 nanometers, and a fairly broad range of infrared and the longest, least visible red wavelengths.

In some embodiments, the surface 132 may be in the form of an integrating cylinder (appropriate designs for which are known by one of ordinary skill in the art) which is configured to trap substantially all or all of the light that falls upon it within a given angle of acceptance, without reflecting it.

In operation, the surface 132 of the purifier is heated. The surface 132 may cause a liquid (e.g., water) within the chamber 100 to boil, producing bubbles in the liquid. Bubbles rising from the surface 132 are forced in a horizontal direction by the baffles 134, which imparts a horizontal momentum to both the bubbles and the liquid surrounding the bubbles or trapped between the bubbles, which may transport the liquid from the inlet 122 to the first outlet 124.

In some embodiments, the chamber 100 may be constructed of a material that is not a good conductor of heat or is a poor conductor of heat. This may aid in preventing bubbles generated by boiling the liquid from condensing from a gas back to the liquid.

In some embodiments, the second outlet 126 is defined by the chamber 100 so that it opposes a wall or walls defining the inlet 122 and proximate the bottom portion of the chamber. For example, the side wall 106 may define the inlet 122, and the side wall 108 may define the second outlet 126. Sediment in the liquid that may collect on the interior surface of the bottom wall 104 of the chamber may be removed though the second outlet 126. For example, to remove the sediment, a liquid stream could be forced though the inlet 122 which could wash the sediment out through the second outlet 126.

The chamber 100 may have any dimensions needed to accomplish the purifying and/or pumping of a liquid. In some embodiments, a plurality of the chambers 100 may be attached together to result in the desired length. For example, two chambers 100 could be arranged so that the first outlet 124 of a first chamber is attached to the inlet 122 of a second chamber.

Many different variations of the purifier shown in FIGS. 1 and 2 are possible. For example, in some embodiments, a purifier may not include a surface 132 that may be heated. Instead, the purifier may include a different mechanism to produce bubbles. For example, bubbles may be formed by forcing air or superheated steam into the liquid through the bottom of chamber.

In some embodiments, the surface 132 may not be disposed inside the chamber 100. For example, the bottom portion of the chamber 100 may include a conductive material. This conductive material may be heated by a surface 132 disposed on the conductive material. Heat may be conducted though the bottom portion of the chamber 100 and cause a liquid contained in the chamber 100 to boil.

In some embodiments, the chamber 100 may not include the second outlet 126. In some embodiments, the chamber may include a hatch or a door proximate the bottom portion of the chamber. For example, the hatch may be defined by the back wall 110, the front wall 112, or the bottom wall 104. The hatch or door may be opened to allow for removal of sediment that may collect in the bottom portion of the chamber 100.

Figure 3:
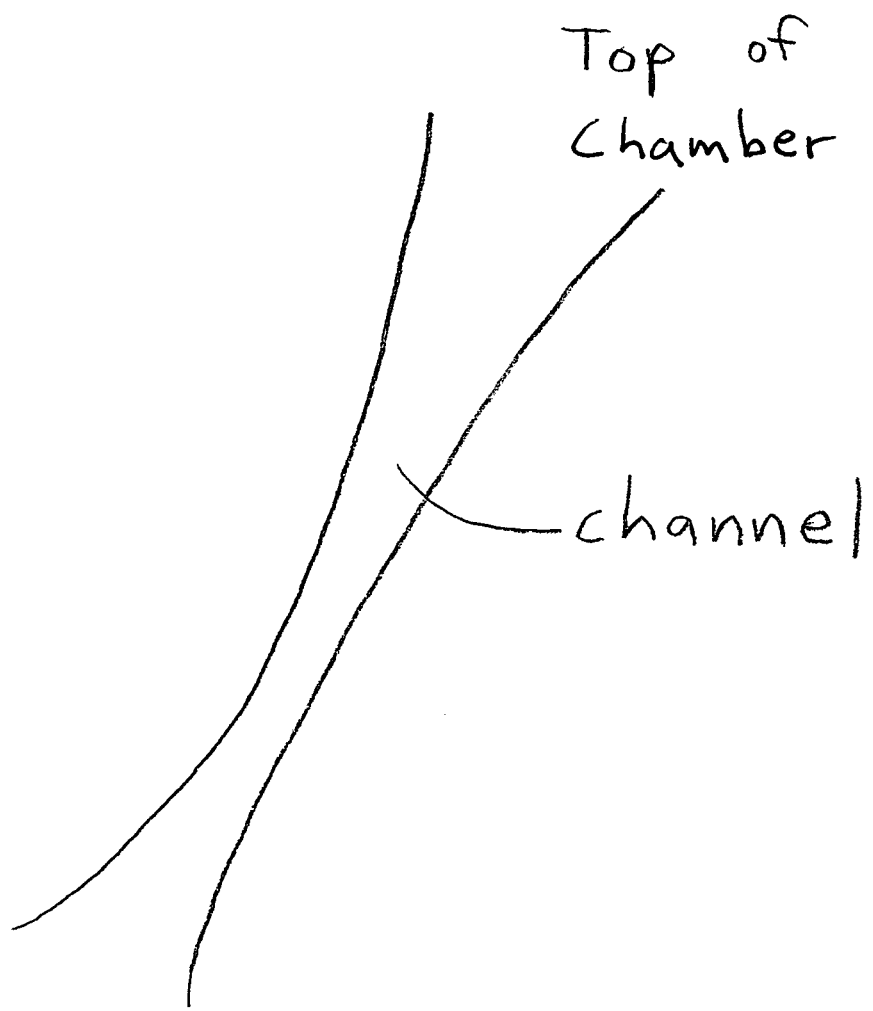
FIG. 3 shows an example of a schematic illustration of a tapering channel.

In some embodiments, the baffles may be arranged to define channels that are wide proximate the bottom portion of the chamber 100, are narrow proximate a middle portion of the chamber 100, and are wide proximate a top portion of the chamber 100. This may aid in the operation of the purifier. For example, a tapering channel may increase the speed with which the bubbles rise. This may reduce the amount of time the bubbles are in the channel, which in turn may reduce the amount of parasitic heat loss. FIG. 3 shows an example of a schematic illustration of such a tapering channel.

In some embodiments, to improve the operation of the purifier, the liquid exiting from the first outlet 124 may heat a first surface. The first surface may be in thermal contact with a second surface. The second surface may be positioned so that liquid flowing into the chamber 100 though the inlet 122 may be pre-heated. For example, in some embodiments, the first surface and the second surface may be pieces of metal that are connected to one another with a wire; the wire may transport heat from the second surface to the first surface.

FIGS. 4 and 5 show examples of schematic illustrations of a phase change purifier/pump. FIG. 5 shows an example of a schematic illustration of a top-down view of the purifier. FIG. 4 shows an example of a cross-sectional schematic illustration of the purifier through line 1-1 of FIG. 5. In some embodiments, the purifier shown in FIGS. 4 and 5 may be similar to the purifier shown in FIGS. 1 and 2. One difference between the two purifiers is the arrangement and configuration of the outlet.

As shown in FIGS. 4 and 5, a purifier includes a chamber 200 having a top wall 202, a bottom wall 204, a side wall 206, a side wall 208, a back wall 210, and a front wall 212. The walls of the chamber 200 define an inlet 222. The back wall 210 of the chamber 200 defines a plurality of outlets 224. In some embodiments, the walls of the chamber 200 may further define a second outlet 226. When the purifier is in operation, the second outlet may be plugged or sealed with a plug 228 or closed off with a valve. The chamber 200 includes a surface 232 that is configured to be heated disposed inside the chamber. Also disposed inside the chamber 200 is a baffle or a plurality of baffles 234. In some embodiments, the baffles may extend to and be in contact with the interior surface of the top wall 202.

While the inlet 222 is shown in FIG. 4 as being located proximate a bottom portion of the chamber 200, in some embodiments, the inlet 222 may be located anywhere along the side wall 206 or the bottom wall 204, provided that the plurality of outlets 224 are above the inlet 222.

In some embodiments, there is one outlet 224 defined in the back wall 210 for each of the channels defined by the plurality of baffles 234. In some embodiments, the arrangement of the plurality of outlets 224 for the chamber 200 may provide for improved pumping of the liquid compared to the chamber 100 described with respect to FIGS. 1 and 2. For the chamber 100, as the liquid is pushed from left to right in FIG. 1, the liquid may flow back down into one of the channels. In contrast, the liquid does not flow from left to right across the tops of the channels in the chamber 200.

In some embodiments, the plurality of outlets 224 of the chamber 200 may be connected to another chamber 251. In this additional chamber 251, both the liquid and the liquid vapor in the bubbles may be collected. The liquid vapor may be input to a condenser, where it may be condensed back to a liquid. The liquid from the condenser may be free from contaminants due to the condensation process. For example, when the liquid in the chamber 200 is water, water formed from vapor using a condenser in communication with the outlets 224 may be used for drinking water and medical uses, and the liquid water which is collected from the outlets 224 may be used for washing or irrigation.

Figure 6:
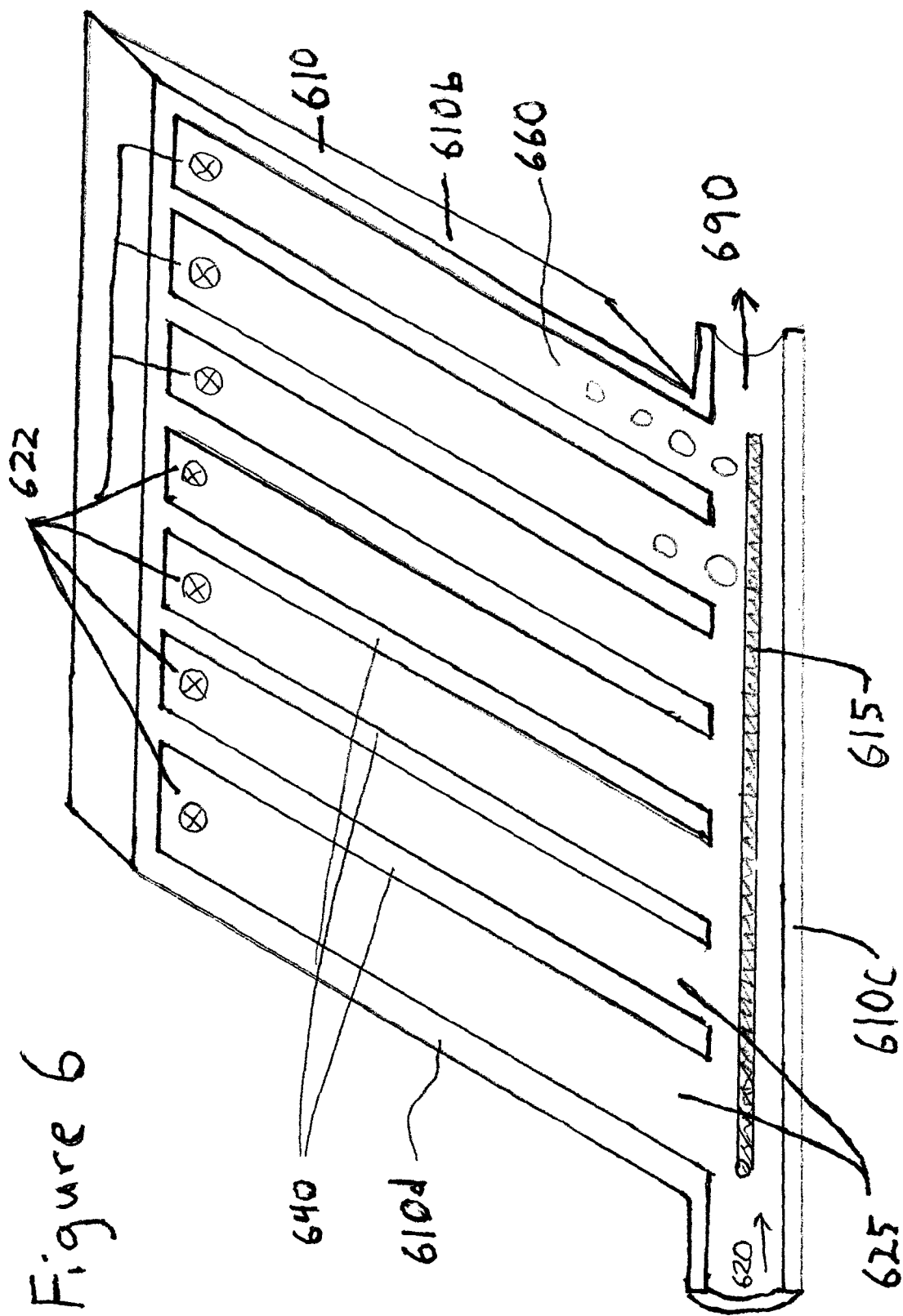
FIG. 6 shows an example of a schematic illustration of a phase change purifier/pump.

FIG. 6 shows an example of a schematic illustration of a phase change purifier/pump. A phase change purifier 600 comprises a chamber 610 having an inlet 620 and a plurality of vents 622. In operation, liquid flows into the chamber 610 through the inlet 620 and out of the chamber 610 through the vents 622. At least one baffle 640 is disposed within the chamber 610. The phase change purifier/pump 600 further comprises a surface 615 configured to be heated, which is in thermal communication with the chamber 610, thereby allowing heating of the liquid that is in fluid communication with the surface 615. Heat from the surface 615 causes a portion of the liquid in the chamber 610 to boil, thereby forming bubbles 660 that rise toward the top of chamber 610. Alternatively, the bubbles 660 may be formed by forcing air or superheated steam into the liquid through the bottom of chamber 610.

In the embodiment shown in FIG. 6, the chamber 610 is a trapezoidal box having a plurality of walls, 610*a*, 610*b*, 610*c*, and 610*d*. While the cross section of the chamber 610 is shown in FIG. 6 as trapezoidal, the shape of the chamber is not so limited, and can include any conveniently-constructed form, such as cylindrical, rectangular, or tapered. The chamber 610 may be constructed of any conveniently-obtained material capable of formed into the desired shape, including metals, plastics, ceramics, glass, or concrete. The material may be chosen so that it is not an effective conductor of heat, in order to prevent the bubbles 660 from condensing from gas to liquid. The chamber 610 may be constructed to any length necessary to accomplish the desired purifying and/or pumping, or it may be made in modular portions that can be attached together to result in the desired length.

In the embodiment shown in FIG. 6, the phase change purifier/pump 600 includes a plurality of baffles 640, defining a plurality of channels 625. In some embodiments, the baffles 640 are angled off the vertical, shown in FIG. 6 as being slanted slightly to the right. In the embodiment shown in FIG. 6, the baffles 640 are located above but not touching the bottom wall 610*c*. Such a configuration allows the bubbles 660 that are formed in the bottom portion of the chamber 610 to rise and be forced horizontally by the baffles 640. In some embodiments, the baffles 640 are sealed to the front and back walls (not shown) of the chamber 610 so that bubbles rising from the bottom of the chamber 610 flow up and around the baffles 640 and do not slip between the baffles 640 and the front and back walls. The baffles 640 may be substantially flat surfaces, or they may be tapered. In some embodiments, the baffles 640 may be hollow; for example, the baffles may be constructed from a plurality of pipes. The baffles 640 may be constructed from any convenient material, and may be (but are not necessarily) constructed the same material used to construct the chamber 610.

As shown in FIG. 6, the bottom wall 610*c* and the left side wall 610*d* define the inlet 620, through which liquid flows into the chamber 610. While the inlet 620 is shown in FIG. 6 as being located at the bottom corner of the chamber 610, its location is not so limited. The inlet 620 may be located anywhere along the walls 610*d* and 610*c*, so long as the difference in height between the inlet 620 and the vents 622 is such that liquid is capable of flowing between them.

As shown in FIG. 6, the vents 622 are located on the back wall (not shown) of the chamber 610, through which the liquid/gas mixture flows out of the chamber 610. In some embodiments, each of the channels 625 includes a vent 622, such that the total number of vents matches the total number of channels. While the vents 622 are shown in FIG. 6 as being perpendicular to the inlet 620, their location is not so limited, and may be located at any convenient angle, and may also be located in the wall 610*a*. In some embodiments, an additional outlet, shown in FIG. 6 as an outlet 690, may be included at the bottom of the chamber, opposite the inlet 620, to allow for the removal of impurities that collect at the bottom of the chamber 610 during operation.

In the embodiment shown in FIG. 6, the surface 615 is in both in thermal and in fluid communication with the chamber 610. Alternatively, the surface 615 can be located outside the chamber 610, such that the surface 615 is only in thermal and not in fluid communication with the chamber 610. In embodiments where the surface 615 is located within the chamber 610 and heated by absorbing sunlight, the portions of the chamber 610 that surround the surface 615 may be constructed from clear material such as clear plastic (for example, polycarbonate), to allow the passage of sunlight.

In some embodiments, the surface 615 comprises a transparent material, such as glass, ceramic, or plastic, that has been coated with a light-absorbing material, such as a dark coating, which allows for the absorption of sunlight and its conversion to heat energy. In some embodiments, the material is Wood's glass or an equivalent material which allows ultraviolet and infrared light to pass through while absorbing the rest of the spectrum. In some embodiments, the absorber is in the form of an integrating cylinder (appropriate designs for which are known in the art) which is designed to trap all light that falls upon it. For designs that use a UV pass through, walls within the chamber 610 can be mirrored, to keep the UV light within the chamber and give it a greater path length through the water.

The surface 615 is heated by a heat source, which can be any means of providing energy, including electric, wood, alcohol, fossil fuels, solar, and wind. In some embodiments, the heat source is powered by means that are cheap and available in lesser developed countries, such as solar energy, agricultural waste, or animal waste.

Figure 7B:
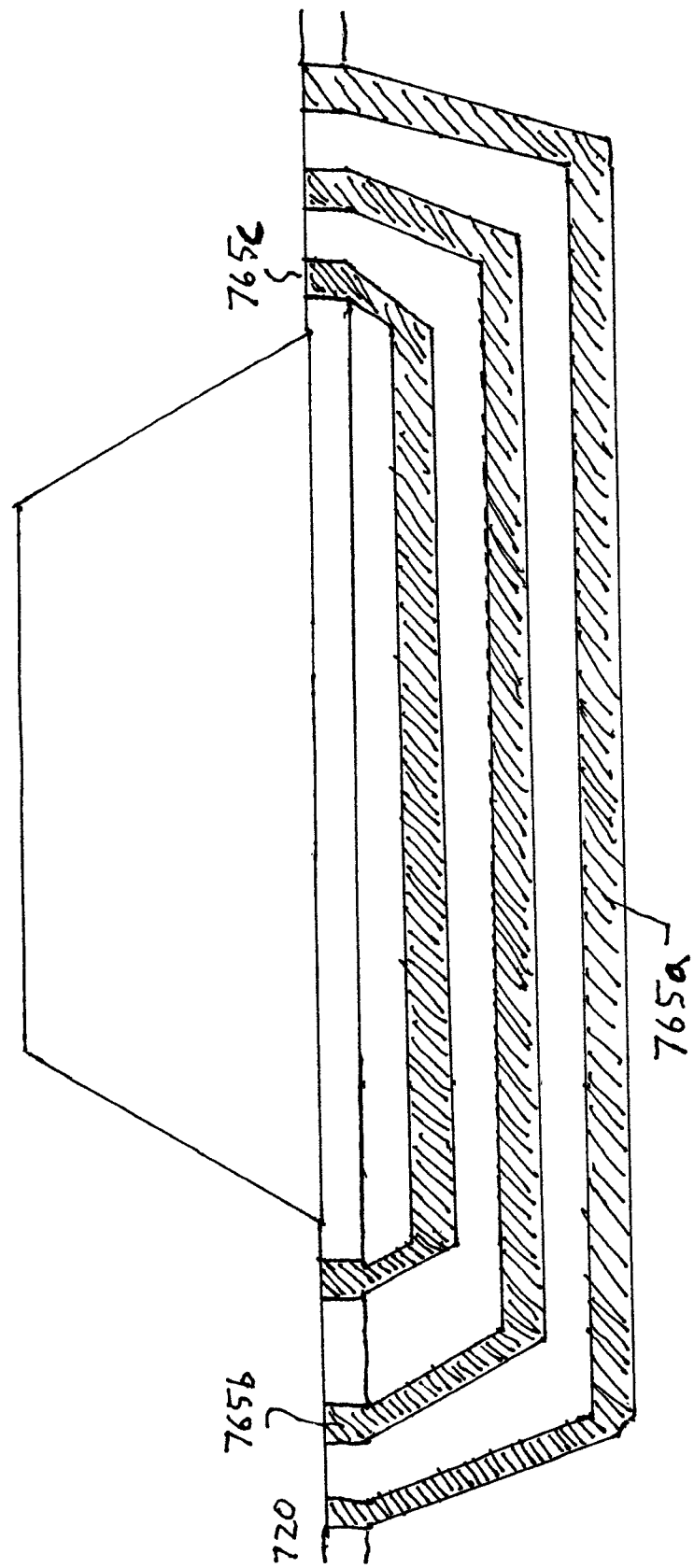

FIGS. 7A and 7B show examples of schematic illustrations of a phase change purifier/pump. FIG. 7A is a cross sectional view of an embodiment of a phase change purifier/pump 700, to which a condenser has been added. As shown in FIG. 7A, a side wall 710*f* of a chamber 710 and a condenser wall 712 together form a plurality of condenser channels 725, in which a plurality of condenser baffles 745 are disposed. In some embodiments, the condenser baffles 745 are angled oppositely from baffles 740 in the chamber 710. As shown in FIG. 7A, the chamber 710 is also coupled to a separation trough 770, in which liquid exiting from the channels 722 accumulates (the accumulated liquid is shown in FIG. 7A as 780, and is sometimes referred to herein as the "pumped liquid"). The pumped liquid ultimately exits the system through a first outlet 730. In some embodiments, a side wall 710*f* of the chamber 710 is hollow or constructed from an insulator so that the chamber 710 is not in thermal communication with the condenser channels.

In operation, liquid flows into the chamber 710 through an inlet 720 and is heated by a surface 715, resulting in the formation of bubbles, which rise up toward the top of the chamber 710 and through channels 722. In some embodiments, the surface 715 may be heated by concentrating light upon it using a solar concentrator 750, e.g., a parabolic trough concentrator. After exiting the chamber 710 through the channels 722, the liquid/gas mixture enters the separation trough 770, which has a cross section that is larger than the cross section of the channels 722, thereby resulting in a reduction of the flow rate. The pumped liquid accumulates in the separation trough, and the gas rises into the condenser channels formed by the side wall 710f and the condenser wall 712. The condenser baffles 745 force the gas to travel horizontally away from the inlet as it condenses. The condensed gas accumulates in a steam trap 775, resulting in a purified liquid. The purified liquid ultimately exits the system through a second outlet 735. In some embodiments, a waste outlet 790 may be added opposite to the inlet to drain sediment which is not pumped out of the chamber 710.

In some embodiments, a discrete heat exchanger, shown in FIG. 7A as 765, can be added to the system in order to increase thermal efficiency. The discrete heat exchanger 765 is shown in a side view in FIG. 7B. As shown in FIG. 7B, the discrete heat exchanger 765 comprises a plurality of heat pipes, shown as 765a, 765b, and 765c, which link the inlet 720 to the first and second outlets 730 and 735. In this embodiment, the heat pipes 765 route the heat in counterflow, mimicking the heat transfer which occurs in a regular tube and shell heat exchanger, by placing first the coldest (most cooled) part of the outlet in thermal communication with the first (not yet preheated) section of the inlet (765a), followed by thermally communicating the next section closest to the heat source (765b), and so on. This allows the exit temperature of the water to approach the temperature of the inlet water, with the highest level of heat recovery from the exit stream. The heat pipes 765 are preferably of solid construction, and may be made of any thermally conductive material known to the art. While the discrete heat exchanger 765 shown in FIG. 7B is constructed of three heat pipes, it is not so limited, and may be constructed of any number of heat pipes in order to achieve the desired thermal efficiency.

FIGS. 8A-8C show examples of schematic illustrations of a phase change purifier/pump. A phase change purifier/pump 800 comprises a chamber 810 having an inlet 820 and a plurality of routing pipes 840. In operation, liquid flows into the chamber 810 through the inlet 820 and out of the chamber 810 through the routing pipes 840. In some embodiments, the chamber 810 and the routing pipes 840 are constructed of clear plastic tubing, with the routing pipes 840 rotated off the vertical about the axis of symmetry of the chamber 810. This configuration would allow the use of regular pipe joints to connect the chamber 810 with the routing pipes 840.

The phase change purifier/pump 800 further comprises a surface 815 configured to be heated, which is in thermal communication with the chamber 810. As shown in FIG. 8B, the surface 815 comprises a blackened surface that may be heated by absorbing sunlight (e.g., from a linear Fresnel concentrator 850). Heat from the surface 815 causes a portion of the liquid in fluid communication with the surface to boil, thereby forming bubbles 860 that rise toward the top of the chamber 810 and up through the routing pipes 840.

As shown in FIG. 8B, the routing pipes 840 are located above but not touching a bottom wall 810a of the chamber 810. Such a configuration allows the bubbles 860 that are formed in the bottom portion of the chamber 810 to rise and be forced horizontally by the routing pipes 840. As shown in FIGS. 8B and 8C, the phase change purifier 800 further includes an accumulator 870 attached to the routing pipes 840. The accumulator 870 is situated to catch liquid forced upward by the bubbles 860 rising up through the routing pipes 840 (i.e., the pumped liquid), as well as any liquid generated from the condensed bubbles. The accumulated liquid ultimately exits the system through an outlet 830.

As shown in FIG. 8A, the bottom wall 810a defines the inlet 820, through which liquid flows into the chamber 810. In some embodiments, additional inlets and/or outlets may be included. For example, an additional outlet, shown in FIG. 8A as waste outlet 890, may be included at the bottom of the chamber 810, opposite the inlet 820, to allow for the removal of impurities that collect at the bottom of chamber 810 during operation.

In the embodiment shown in FIGS. 8A-8C, the surface 815 is in both in thermal and in fluid communication with chamber 810. Alternatively, the surface 815 may be located outside the chamber 810, such that the surface 815 is only in thermal and not in fluid communication with the chamber 810. In embodiments where the surface 815 is located within the chamber 810 and heated by absorbing sunlight, the portions of the chamber 810 that surround the surface 815 may be constructed from clear material, such as clear plastic (e.g., polycarbonate), to allow the passage of sunlight. In such embodiments, the liquid collected in the accumulator 870 is cleansed by UV light.

Figure 9:
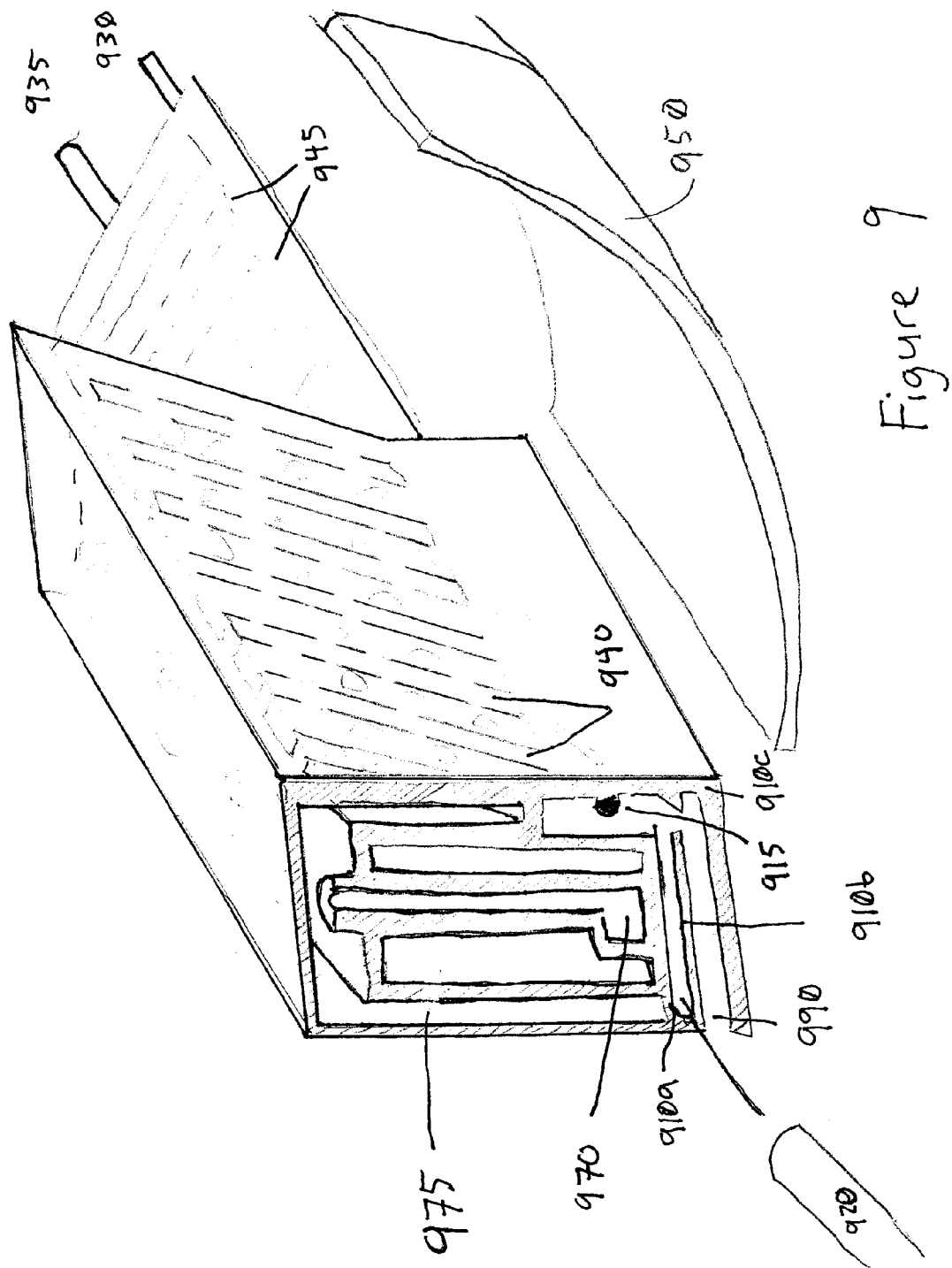
FIG. 9 shows an example of a schematic illustration of a phase change purifier/pump.

FIG. 9 shows an example of a schematic illustration of a phase change purifier/pump. A phase change purifier/pump 900 comprises a chamber 910 having an inlet 920 and first and second outlets 930 and 935, respectively. In operation, liquid flows into the chamber 910 through the inlet 920 and out of the chamber 910 through the first outlet 930. At least one baffle 940 is disposed within chamber 910. The phase change purifier/pump 900 further comprises a solar thermal concentrator 950, which concentrates light and reflects it onto the chamber 910. Specifically, the solar thermal concentrator 950 reflects light onto a coated side wall 910c of the chamber 910, thereby heating the liquid that is in fluid communication with the coated side wall 910c. Heat from the solar thermal concentrator 950 causes a portion of the liquid in fluid communication with the side wall 910c to boil, thereby forming bubbles 960 that rise toward the top of the chamber 910. Coated side wall 910c may be coated with any optically absorbent material, such as black paint, varnish, and the like. In the embodiment shown in FIG. 9, the solar thermal concentrator 950 is a parabolic trough concentrator or linear Fresnel lens, optionally routing the light with a second mirror. Such systems do not require that the system be moved during use (except possibly to compensate for summer/winter positions of the sun in the sky).

As shown in FIG. 9, the phase change purifier/pump 900 further includes a separation trough 970 located at the top of the chamber 910, situated to catch liquid forced upward by the bubbles 960 rising up through the chamber 910. The liquid forced upward by the bubbles 960 collects in the separation trough 970, and exits via the first outlet 930. Additionally, the bubbles 960 rising up through the chamber 910 contain gas which will exit through the second outlet 935 via a condensation stage 975. Because gas in the bubbles will be free from impurities contained in the liquid, liquid exiting the chamber 910 from the second outlet 935 will be pure, even if the liquid at the inlet is contaminated water. Optional baffles 945 (inside of the condensation stage 975), angled in an opposite direction to the baffles 940, may cause the condensate to acquire more horizontal kinetic energy as the condensate falls.

As shown in FIG. 9, the side wall 910c and left side wall define the inlet 920, through which liquid flows into the chamber 910. A top wall 910a and a right side wall 910b define a waste outlet 990, through which impurities that collect at the bottom of the chamber 910 may be removed. In some embodiments, the waste outlet 990 is located on the opposite side of the inlet 920, as shown in FIG. 9. While the inlet 920 and the first and second outlets 930 and 935 are shown in FIG. 9 as being located at the bottom and top corners of the chamber 910, respectively, their locations are not so limited. The inlet 920 may be located anywhere along the left side wall and the side wall 910c and the first and second outlets 930 and 935 may be located anywhere along the walls 910a and 910b, so long as (1) the difference in height between the inlet 920 and the first outlet 930 is such that liquid is capable of flowing between them, and (2) the difference in height between the inlet 920 and the second outlet 935 is such that gas bubbles may rise and exit through the second outlet 935. In some embodiments, additional inlets and/or outlets may be included. For example, an additional outlet, shown in FIG. 9 as the waste outlet 990, may be included at the bottom of the chamber, opposite the inlet 920, to allow for the removal of impurities that collect at the bottom of the chamber 910 during operation.

In the embodiment shown in FIG. 9, the phase change purifier/pump 900 includes a plurality of baffles 940. As shown in FIG. 9, the baffles 940 are located above but not touching the bottom wall 910c. Such a configuration allows the bubbles 960 that are formed in the bottom portion of the chamber 910 to rise and be forced horizontally by the baffles 940. As shown in FIG. 9, the baffles 940 are sealed to front and back walls, so that bubbles rising from the bottom of the chamber 910 flow up and around the baffles 940 but not into the space between the baffles 940 and the front and back walls.

In the embodiment shown in FIG. 9, the surface 915 configured to be heated is in only thermal and not fluid communication with the chamber 910. Alternatively, the surface 915 may be located inside the chamber 910, such that surface is in thermal and in fluid communication with the chamber 910. In embodiments where surface is located within the chamber 910 and heated by absorbing sunlight, the portions of the chamber 910 that route light may be constructed from clear material, such as clear plastic (for example, polycarbonate or acrylic), to allow the passage of sunlight. In such embodiments, the liquid 980 collected in separation the trough 970 is cleansed by UV light.

Figure 10:
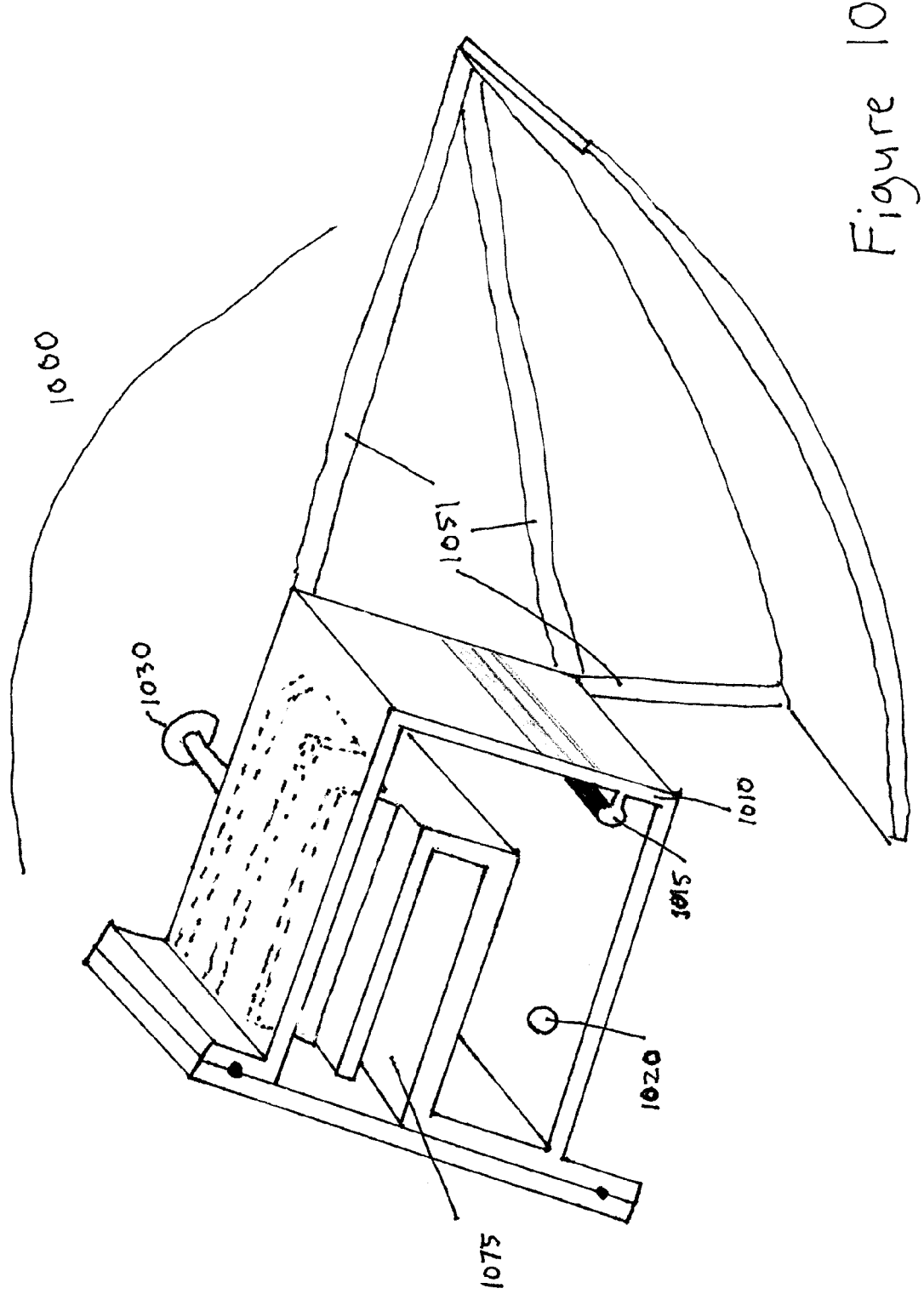
FIG. 10 shows an example of a schematic illustration of a phase change purifier.

FIG. 10 shows an example of a schematic illustration of a phase change purifier, without a pumping function. Such an embodiment may be useful in smaller-scale applications where pumping is not necessary, such as for short term disaster relief or for recreational use, such as camping or backpacking. A phase change purifier 1000 comprises a substantially U-shaped chamber 1010, which is removable for filling (via a cap 1020) and cleaning from the rest of the pump by any of the means known in the art. The chamber 1010 empties through a cap 1030, which serves as an outlet for the system.

The phase change purifier 1000 further comprises a surface 1015 configured to be heated, which may be in both thermal and fluid communication with the chamber 1010. In some embodiments, surface 1015 may be heated by a solar concentrator 1050 (e.g. a parabolic trough concentrator). Heat from the surface 1015 causes a portion of the liquid in fluid communication with the surface 1015 on the bottom wall 1010a to boil, thereby forming bubbles that rise toward the top of the chamber 1010. At least one baffle 1040 is disposed within the chamber 1010, preventing fluid above the bubbles from sliding around the bubbles as they rise and allowing the fluid to be forced upward.

As shown in FIG. 10, the phase change purifier 1000 further includes an accumulator 1075, located on top of the chamber 1010. Liquid forced upward by the bubbles, as well as condensed gas, exit through vents 1022 and are collected in the accumulator.

In the embodiment shown in FIG. 10, the phase change purifier 1000 includes a plurality of baffles 1040. As shown in FIG. 10, the baffles 1040 are located above but not touching the bottom wall 1010a. Such a configuration allows the bubbles that are formed in the bottom portion of the chamber 1010 to rise and be forced horizontally by the baffles 1040. As shown in FIG. 10, the baffles 1040 are sealed to front and back walls, so that bubbles rising from the bottom of the chamber 1010 rise up and around the baffles 1040 but not into the space between the baffles 1040 and the front and back walls.

In the embodiment shown in FIG. 10, the surface 1015 is in both in thermal and in fluid communication with the chamber 1010. Alternatively, the surface 1015 can be located outside the chamber 1010, such that the surface 1015 is only in thermal and not in fluid communication with the chamber 1010. In embodiments where the surface 1015 is located within the chamber 1010 and heated by absorbing sunlight, the portions of the chamber 1010 that route light may be constructed from clear material, such as clear plastic (e.g., polycarbonate), to allow the passage of sunlight. In such embodiments, liquid collected in the accumulator 1075 is cleansed by UV light. In some embodiments, the exterior six walls of the phase change purifier 1000 are silvered to trap UV light and allow it to reflect at multiple angles within the chamber, sterilizing the liquid inside. An external valve, condenser or expansion device may be added to the system to accommodate the pressure changes caused by boiling in some applications.

Method of Use

Figure 11:
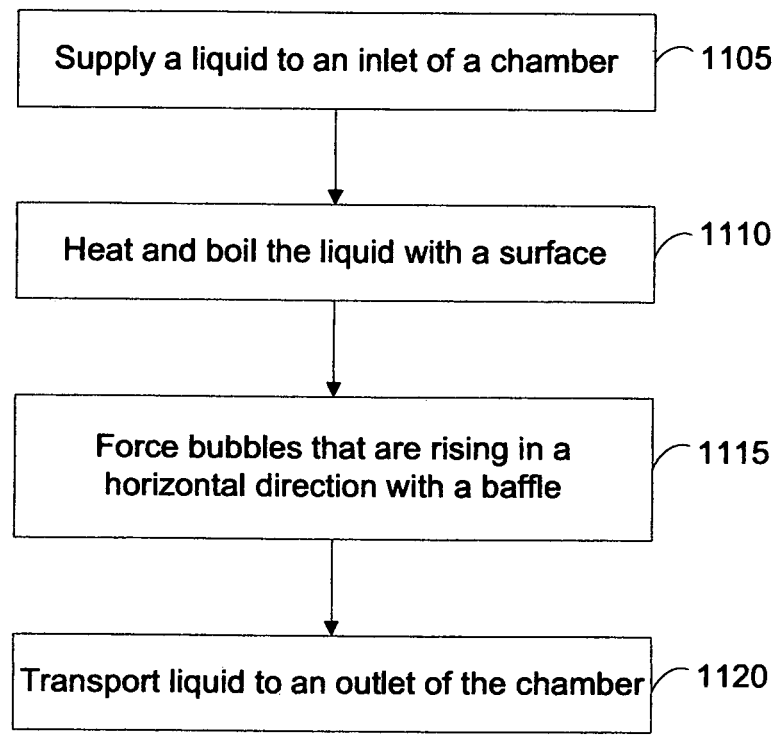
FIG. 11 shows an example of a flow diagram illustrating a method of use of a phase change purifier/pump.

FIG. 11 shows an example of a flow diagram illustrating a method of use of a phase change purifier/pump. The method 1100 shown in FIG. 11 may be applicable to any of the phase change purifies disclosed herein.

In operation 1105, a liquid is supplied to an inlet of a chamber. The chamber has a top portion, a bottom portion, and a baffle disposed within the chamber. The baffle is disposed at an angle relative to a vertical direction.

In operation 1110, the liquid is heated and boiled with a surface proximate the bottom portion of the chamber. In some embodiments, heating and boiling the liquid may aid in sterilizing the liquid. In operation 1115, bubbles rise from the surface and are forced in a horizontal direction by the baffle disposed in the chamber. The bubbles, when rising through a channel defined by the baffle, may trap liquid in between and force the liquid in a horizontal direction. In operation 1120, the liquid is transported to an outlet of the chamber. The liquid may be collected at the outlet.

In some embodiments, when the steam is separated using a condenser, the outlet from the condenser may be used for drinking water and medical uses, and the water which is pumped may be used for washing or irrigation.

CONCLUSION

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A device comprising: a chamber including a top portion and a bottom portion; a surface configured to be heated proximate the bottom portion of the chamber; a baffle disposed within the chamber and located above but not touching the bottom portion of the chamber, the baffle being disposed at an angle relative to a vertical direction; an inlet for supplying liquid to the chamber; and a first outlet for removing liquid from the chamber, wherein the surface heats the liquid in the chamber, causing the liquid to boil and wherein the device is selected from the group consisting of a pump, a liquid purifier, a distiller and a desalinator.

2. The device of claim 1, wherein the inlet is proximate the bottom portion.

3. The device of claim 1, wherein the first outlet is proximate the top portion.

4. The device of claim 1, wherein the baffle is angled away from the inlet.

5. The device of claim 1, wherein the baffle is angled toward the outlet.

6. The device of claim 1, wherein the surface is disposed within the chamber.

7. The device of claim 1, wherein the surface is disposed on an outer surface of the chamber.

8. The device of claim 1, wherein the surface is configured to be heated with solar energy.

9. The device of claim 1, wherein the surface comprises a visible light-absorbing material.

10. The device of claim 9, wherein the visible light-absorbing material comprises a dark-colored material.

11. The device of claim 9, wherein the visible light-absorbing material is transparent to ultraviolet radiation.

12. The device of claim 1, wherein the inlet is proximate a first side of the chamber, and wherein the first outlet is proximate a second side of the clamber.

13. The device of claim 12, further comprising: a second outlet, wherein the second outlet is proximate the bottom portion of the chamber, and wherein the second outlet is proximate the second side of the chamber.

14. A device comprising: a chamber including a top portion and a bottom portion, the chamber being defined by a top wall, a bottom wall, a first side wall, a second side wall, a back wall, and a front wall; a surface configured to be heated proximate the bottom portion of the chamber; a baffle disposed within the chamber and located above but not touching the bottom wall of the chamber, the baffle being disposed at an angle relative to a vertical direction; an inlet for supplying liquid to the chamber; and a plurality of outlets for removing liquid from the chamber, the plurality of outlets being defined by the back wall and proximate a top portion of the chamber, wherein the surface heats the liquid in the chamber, causing the liquid to boil; and wherein the device is selected from the group consisting of a pump, a liquid purifier, a distiller and a desalinator.

15. The device of claim 14, wherein the baffle is angled away from the inlet.

16. The device of claim 14, wherein the surface is disposed within the chamber.

17. The device of claim 14, wherein the surface is disposed on an outer surface of the chamber.

18. The device of claim 14, wherein the surface is configured to be heated with solar energy.

19. The device of claim 14, wherein the surface comprises a visible light-absorbing material.

20. The device of claim 19, wherein the visible light-absorbing material comprises a dark-colored material.

21. The device of claim 19, wherein the visible light-absorbing material is transparent to ultraviolet radiation.

22. A method of purifying a liquid, comprising:
supplying the liquid to an inlet of a chamber, the chamber including a top portion and a bottom portion, a surface configured to be heated proximate the bottom portion, a baffle disposed within the chamber and located above but not touching the bottom portion of the chamber, the baffle being disposed at an angle relative to a vertical direction;
removing the liquid from the chamber using a first outlet;
heating the liquid in the chamber with the first surface, causing the liquid to boil.

* * * * *